US012596911B2

(12) United States Patent
Kim et al.

(10) Patent No.: US 12,596,911 B2
(45) Date of Patent: Apr. 7, 2026

(54) METHOD AND APPARATUS WITH NEURAL NETWORK CONTROL

(71) Applicants:Samsung Electronics Co., Ltd., Suwon-si (KR); Seoul National University R&DB Foundation, Seoul (KR)

(72) Inventors: Jongseok Kim, Suwon-si (KR); Hyun Oh Song, Seoul (KR); Yeonwoo Jeong, Seoul (KR)

(73) Assignees: Samsung Electronics Co., Ltd., Suwon-si (KR); Seoul National University R&DB Foundation, Seoul (KR)

( * ) Notice: Subject to any disclaimer, the term of this patent is extended or adjusted under 35 U.S.C. 154(b) by 715 days.

(21) Appl. No.: 17/979,962

(22) Filed: Nov. 3, 2022

(65) Prior Publication Data

US 2023/0244910 A1 Aug. 3, 2023

(30) Foreign Application Priority Data

Jan. 28, 2022 (KR) ........................ 10-2022-0013697

(51) Int. Cl.
*G06N 3/045* (2023.01)
*G06N 3/08* (2023.01)

(52) U.S. Cl.
CPC .............. *G06N 3/045* (2023.01); *G06N 3/08* (2013.01)

(58) Field of Classification Search
CPC .......... G06N 3/04; G06N 3/045; G06N 3/063; G06N 3/08; G06N 3/084
See application file for complete search history.

(56) References Cited

U.S. PATENT DOCUMENTS

| | | | |
|---|---|---|---|
| 10,635,891 B2 | 4/2020 | El-Khamy et al. | |
| 10,795,364 B1 * | 10/2020 | Abeloe | B60W 30/0956 |
| 2019/0204832 A1 * | 7/2019 | Abeloe | G05D 1/0088 |
| 2020/0137384 A1 * | 4/2020 | Kwong | G06N 3/088 |
| 2021/0037185 A1 * | 2/2021 | Tanabe | G06N 3/063 |
| 2021/0195128 A1 * | 6/2021 | Hanada | G06F 18/2413 |

(Continued)

FOREIGN PATENT DOCUMENTS

WO WO 2020/122753 A1 6/2020

OTHER PUBLICATIONS

Han Cai et al. , "Once-For-All: Train One Network and Specialize It for Efficient Deployment," Apr. 29, 2020, arXiv:1908.09791v5, Published as a conference paper at ICLR 2020, pp. 1-10.*

(Continued)

*Primary Examiner* — Omar S Ismail

(74) *Attorney, Agent, or Firm* — NSIP Law

(57) ABSTRACT

A method and apparatus with neural network control are provided. In one general aspect, a method is performed by at least one processor of an apparatus, the method includes selecting neural networks from among available neural networks with respective input image resolutions, including plural resolutions, wherein the selected neural networks are selected based on a sum of amounts of mutual information between the selected neural networks being minimal and based on a limiting condition of a use of the available neural networks, and configuring the available neural networks to perform an inference on input data, wherein the configuring is based on the combination of the selected neural networks.

23 Claims, 8 Drawing Sheets

(56)     References Cited

U.S. PATENT DOCUMENTS

| 2021/0271912 | A1* | 9/2021 | Wu | ........................... | G06T 7/40 |
| 2021/0397899 | A1* | 12/2021 | Watanabe | .............. | G06N 3/045 |
| 2023/0244910 | A1* | 8/2023 | Kim | ....................... | G06N 3/045 |
| | | | | | 706/14 |
| 2024/0095986 | A1* | 3/2024 | Juravsky | ................ | G06V 10/82 |

OTHER PUBLICATIONS

Thai Hoang Le, "Applying Artificial Neural Networks for Face Recognition," Nov. 3, 2011, Advances in Artificial Neural Systems, vol. 2011, Article ID 673016, pp. 1-11.*

Oludare Isaac Abiodun et al., "Comprehensive Review of Artificial Neural Network Applications to Pattern Recognition," Nov. 12, 2019, IEEEAccess, vol. 2019, pp. 158820-158835.*

Haoyu Ren et al., "Image Super Resolution Based on Fusing Multiple Convolution Neural Networks," Jul. 2017, Proceedings of the IEEE Conference on Computer Vision and Pattern Recognition (CVPR) Workshops, 2017, pp. 54-60.*

Xi Yin et al., "Multi-Task Convolutional Neural Network for Pose-Invariant Face Recognition," Oct. 23, 2017, IEEE Transactions on Image Processing, vol. 27, No. 2, Feb. 2018, pp. 964-968.*

Roberto Battiti, "Using Mutual Information for Selecting Features in Supervised Neural Net Learning," Sep. 16, 1992, IEEE Transactions on Neural Networks, vol. 5, No. 4, Jul. 1994, pp. 537-541.*

Cai, Han, et al. "Once-for-all: Train one network and specialize it for efficient deployment." *arXiv preprint arXiv:1908.09791* (2019).

* cited by examiner

From 110

Select S = [n1,...,nm], which is combination in which
sum of amounts of mutual information is minimum among
combinations having size of M          310

|S| = M          311

Re-train selected combination S
$$\min_{\theta_s} L(F_s; \theta_s)$$          320

Extract S' = [nk,...,nm], which are some neural networks
having small size from S          330

Set k          331

To 130

METHOD AND APPARATUS WITH NEURAL NETWORK CONTROL

CROSS-REFERENCE TO RELATED APPLICATIONS

This application claims the benefit under 35 USC § 119(a) of Korean Patent Application No. 10-2022-0013697, filed on Jan. 28, 2022, in the Korean Intellectual Property Office, the entire disclosure of which is incorporated herein by reference for all purposes.

BACKGROUND

1. Field

The following description relates to a method and apparatus with neural network control.

2. Description of Related Art

As the size of training data and the size of models increase, due to the development of computing resources such as a graphics processing units (GPUs) for training and/or operation of deep-learning models, the accuracy of inference has significantly improved. However, large amounts of computing resources may be used for the operation or to increase inference speeds. It is difficult to directly perform the training and inference of a large-scale deep learning model on a lightweight device, for example a mobile device, in which the computing resources may be limited.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method is performed by at least one processor of an apparatus, the method includes selecting neural networks from among available neural networks with respective input image resolutions, including plural resolutions, wherein the selected neural networks are selected based on a sum of amounts of mutual information between the selected neural networks being minimal and based on a limiting condition of a use of the available neural networks, and configuring the available neural networks to perform an inference on input data, wherein the configuring is based on the combination of the selected neural networks.

The method may further include forming different candidate combinations of the available neural networks based on a combination size limit, generating, for the candidate combinations, respective sums of amounts of mutual information between the neural networks in each of the candidate combinations, and selecting the combination from among the candidate combinations based on the combination having the lowest of the generated sums of amounts of mutual information.

The method may further include selecting, based on an inference-time limiting condition, at least one neural network among the neural networks included in the selected combination.

The limiting condition may limit at least one of a number of neural networks in the combination, a size of a neural network in the combination, or an inference time of a neural network in the combination.

The state information of the apparatus may include information on either a type of the apparatus, a hardware specification of the apparatus, a speed of an inference operation to be performed by the apparatus, or an accuracy of an inference operation to be performed by the apparatus.

The configuring may include activating the neural networks in the combination.

The method may further include re-training, based on training data, a neural network in the combination.

The method may further include performing a first inference operation on the input data based on a first neural network in the combination, performing a second inference operation on the input data based on a second neural network in the combination, wherein the second inference operation is performed while the first inference operation is not being performed.

The method may further comprise at least one of: training each of the available neural networks based on images having respectively different resolutions, or training all of the available neural networks based on images having a plurality of resolutions.

The apparatus may be a mobile computing device.

The mobile computing device may be a smartphone.

The respective input image resolutions may be different input image resolutions, and the available neural networks have characteristics of having been trained with respective different training image resolutions.

In one general aspect, a method is performed by at least one processor of an apparatus, the method includes accessing, among available neural networks with respective input image resolutions, including plural resolutions, a combination of the available neural networks, wherein neural networks in the combination are selected based on an amount of mutual information therebetween, and configuring the neural networks in the combination to perform an inference on input data based on an inference-time limiting condition.

The amount of mutual information of the combination may be minimum among amounts of mutual information of respective combinations of the available neural networks, wherein the combinations may be formed based on a limiting condition of an intended use of the available neural networks.

In one general aspect, an apparatus includes one or more processors, a memory storing instructions is configured to cause the one or more processors to select neural networks from among available neural networks, wherein the available neural networks are configured for respective input image resolutions, including plural image resolutions, wherein the selected neural networks are selected based on a sum of amounts of mutual information between the selected neural networks being minimal and based on a limiting condition of a use of the available neural networks, and configure the available neural networks to perform an inference on input data, wherein the configuring is based on the combination of the selected neural networks.

The memory may be configured to store the available neural networks.

The instructions may be further configured to cause the one or more processors to select some of combinations of the available neural networks as candidates, based on a combination-size limiting condition, generate sums of amounts of mutual information of one or more pairs of neural networks in each of the combinations selected as the candidates, and select a combination having a generated sum of amounts that may be the lowest among the sums.

The instructions may be further configured to cause the one or more processors to select, based on an inference-time limiting condition, at least some neural networks among the neural networks included in the selected combination.

The instructions may be further configured to cause the one or more processors to set the limiting condition based on state information of the apparatus.

The instructions may be further configured to cause the one or more processors to activate the neural networks included in the combination.

The instructions may be further may be configured to cause the one or more processors to re-train, based on training data, a neural network included in the selected combination.

The instructions may be further configured to cause the one or more processors to perform a first inference operation on the input data based on a first neural network in the combination, and perform a second inference operation on the input data based on a second neural network in the combination, wherein the second inference operation may be performed while the inference operation may be not being performed.

The instructions may be further configured to cause the processor to perform at least one of an operation of training each of the available neural networks based on images having respectively different resolutions, or an operation of training all of the available neural networks based on images having a plurality of resolutions.

In one general aspect, an apparatus includes one or more processors, a memory storing instructions is configured to cause the one or more processors to acquire, among available neural networks, each trained for a different respective input image resolution, wherein a combination of the available neural networks is selected based on an amount of mutual information between at least a pair of the available neural networks, and configure a neural network in the selected combination to perform inference on input data, based on a limiting condition on an inference time.

In one general aspect, a method is performed by one or more computing devices, the method includes storing neural networks in a memory, each neural network is configured to output a same type of inference for a same type of input data, determining a limiting condition associated with a task to be performed by the one or more computing devices, selecting a combination of the neural networks based on the combination of the neural networks satisfying the limiting condition and dependent on mutual information with respect to two or more of the neural networks, generating inferences by the respective neural networks in the combination, and performing the task based on the inferences.

The method may further include selecting the neural networks based on a measure of the mutual information between the neural networks.

The inferences may be performed based on one or more images inputted to the neural networks further may further include selecting, wherein the one or more images represent a same object, and wherein the inferences may be inferences about the same object.

The combination may include a first and second of the neural networks, wherein the first neural network may have been trained for a first image resolution, wherein the second neural network may have been trained for a second image resolution, wherein the inferences include a first inference generated by the first neural network based on an image of the object at a first resolution, wherein the inferences include a second inference generated by the second neural network based on a second image of the object at a second resolution, and wherein the task may be performed based on the first inference and the second inference.

The one or more computing devices may comprise a camera, and wherein the first and second images may be provided based on output of the camera.

The method may further include receiving the neural networks via a network from a server or cloud service.

Other features and aspects will be apparent from the following detailed description, the drawings, and the claims.

Figure 1:
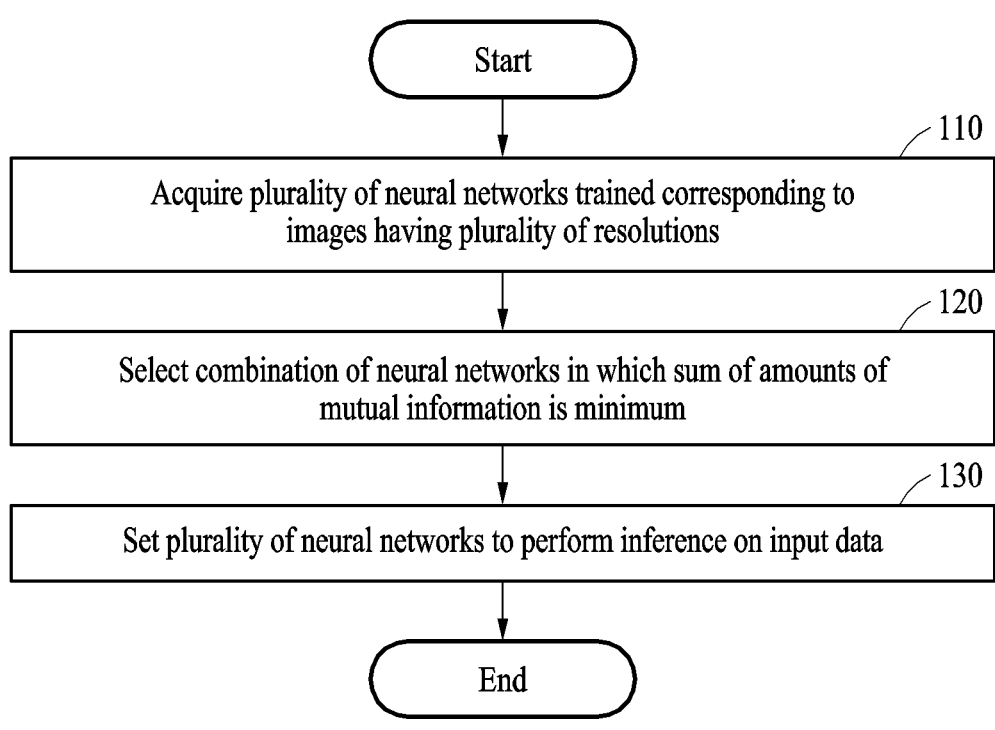
FIG. 1 is a flowchart illustrating an example of a method of controlling a neural network, according to one or more embodiments.

Throughout the drawings and the detailed description, unless otherwise described or provided, the same drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

FIG. 1 is a flowchart illustrating an example of a method of controlling a neural network, according to one or more embodiments. As used herein, "neural network" in the singular may, depending on the context, refer to a combination of multiple neural networks.

Referring to FIG. 1, a method of controlling a neural network, according to an example, may include: operation 110 of acquiring (or accessing) neural networks trained corresponding to images having varying resolutions; operation 120 of selecting a combination of the neural networks in which a sum of amounts of mutual information is minimal; and operation 130 of setting the plurality of neural networks to perform inference on input data.

The example method of controlling a neural network, according to an example, may be performed by at least one processor of an apparatus for performing an inference operation using the neural network. The apparatus may store the plurality of neural networks and performing the inference operation using at least some of the plurality of neural networks (including one or all of the neural networks). The apparatus may be, for example, a mobile device, a personal computer (PC), and/or a home appliance. Configurations of the apparatus according to examples are described in detail later.

The neural networks acquired (or accessed) in operation 110, according to an example, may include a neural network configured for processing images. For example, the neural network related to image processing may include a neural network configured for face recognition, object recognition, and/or object detection (e.g., a face recognition inference type, an object recognition inference type, and/or an object detection inference type), or providing other inferences about images as an example input type, as a non-limiting example. In some embodiments, the neural networks may be convolutional neural networks.

Figure 2:
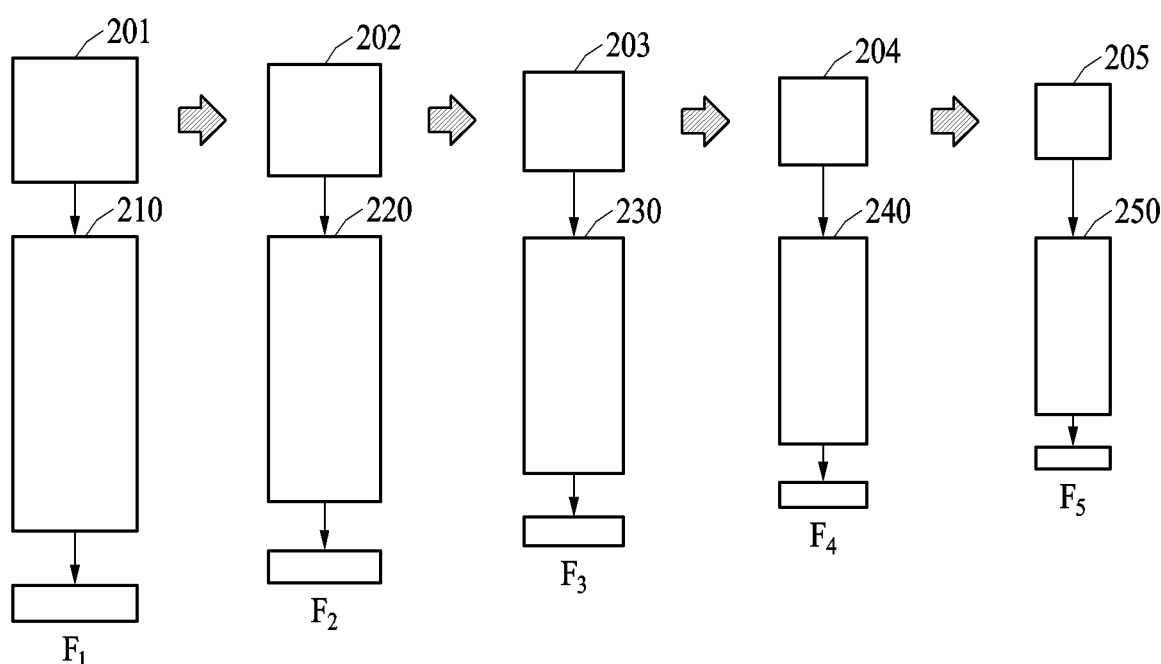
FIG. 2 illustrates an example of a plurality of neural networks trained based on images having different resolutions, according to one or more embodiments.

Each of the acquired (or accessed) neural networks, according to an example, may include a neural network trained based on images having varying resolutions. In other words, resolutions of some of the images used for training each neural network may be different from each other. For example, referring to FIG. 2, the acquired (or accessed) neural networks may include five neural networks 210, 220, 230, 240, and 250 trained based on images 201, 202, 203, 204, and 205 having different respective resolutions. The first neural network 210 may be trained based on the image 201 having a first resolution, and the second neural network 220 may be trained based on the image 202 having a second resolution that is different from the first resolution. As the resolution of the image used for the training increases, the size of the corresponding neural network may increase. For example, referring to FIG. 2, when the resolution of the image 201 is the highest, and the resolution images decreases toward the image 205, the size of the neural network 210 trained using the image 201 may be largest, and the size of the neural network 250 trained using the image 205 may be smallest. The neural networks 210, 220, 230, 240, and 250 trained using images having respective resolutions (of decreasing size) may, when performing inference for non-training images, respectively output feature representations F1, F2, F3, F4 and F5 (e.g., respectively predicted features) respectively corresponding to the input images 201, 202, 203, 204, and 205. In other words, neural networks trained with large (high information level) training items will generally be larger than neural networks trained with smaller (lower information level) training items. In some embodiments, the feature representations may be features of a same object in one or more images processed by the respective neural networks.

As used herein, it will be appreciated that a neural network trained for image processing, e.g., a convolutional neural network, may have an effective input image resolution that differs from the actual images inputted thereto. In other words, for example, a neural network may be trained for smaller resolution images, and may have an initial filter that significantly down-samples (reduces) the input image (which might initially be large) to the effective working resolution of the neural network. In other words, the sizes and accuracies of the neural networks described herein should be understood in terms of the level of information they effectively make predictions on, and generally, on the same apparatus, larger neural networks will make predictions on an input having more information than a smaller neural network, and correspondingly, will do so with greater accuracy and lower speed (total time to derive an inference). Discussion of the size or resolution of training data (e.g., training image sizes) of neural networks should be understood to correspond to the effective size/resolution of image data that the neural network makes an inference upon, rather the actual size/resolution of an image immediately passed to a neural network. In some embodiments, the neural networks may perform inferences for different version (e.g., resolutions) of a same base image, or may perform inferences for different images (of different resolutions) of a same object for which the features are to be inferred/predicted.

Operation 110, according to an example, may include training one or more of the neural networks 210-250 based on the images having different resolutions, and/or training all of the neural networks based on the images having plural resolutions.

For example, N neural networks may be trained such that a sum of loss functions that respectively correspond to the neural networks is minimal (e.g., a local minimum), as shown in Equation 1 below.

$$\min_{\theta_{1:N}} \sum_{i=1}^{N} L(F_i; \theta_i) \qquad \text{Equation 1}$$

In Equation 1, $L(F_i; \theta_i)$ may be a loss function corresponding to the i-th neural network, $F_i$ may be a feature representation (e.g., a probability of a particular feature or category) output from the i-th neural network, and $\theta_i$ may be a parameter of the i-th neural network (e.g., a weight).

As another example, N neural networks may be trained such that a sum of loss functions that respectively correspond to the neural networks (e.g., Equation 1) and a sum of loss functions corresponding to all neural networks are minimum, as shown in Equation 2 below.

$$\min_{\theta_{1:N}} L([F_1, \dots, F_N]; \theta_{1:N}) + \sum_{i=1}^{N} L(F_i; \theta_i) \qquad \text{Equation 2}$$

In Equation 2, $L([F_1, \dots, F_N]; \theta_{1:N})$, may be loss functions where each of such loss functions corresponds to a loss for all of the neural networks.

Operation 120, according to an example, may include selecting a combination of the neural networks in which a sum of amounts of mutual information between the selected neural networks is minimum, based on the limiting condition on the use of the neural networks.

Mutual information, or the amount of mutual information, may be a measure indicating an extent of a mutual dependency of two jointly discrete random variables, and may be a quantified amount of information acquired by observing the other random variable from one random variable of the two. The amount of mutual information of two discrete random variables X and Y may be generally defined as shown in Equation 3 below.

$$I(X; Y) = \sum_{y \in Y} \sum_{x \in X} p(x, y) \log\left(\frac{p(x, y)}{p(x)p(y)}\right) \qquad \text{Equation 3}$$

In Equation 3, p(x, y) is a joint distribution function of X and Y, p(x) is a marginal distribution function of X, and p(y) is a marginal distribution function of Y.

The amount of mutual information between continuous random variables may be generally defined as shown in Equation 4 below.

$$I(X; Y) = \int_Y \int_X p(x, y) \log\left(\frac{p(x, y)}{p(x)p(y)}\right) dx dy \qquad \text{Equation 4}$$

The sum of amounts of mutual information of the combination of the neural networks may correspond to a sum of values of amounts of mutual information between each unique pair of neural networks included in the combination. The amount of mutual information of a given pair of neural networks may correspond to an amount of mutual information between the feature representation output from one neural network in the given pair and the feature representation output from the other neural network in the given pair. For example, a selection of the combination of the neural networks in which the sum of amounts of mutual information (of the constituent neural networks) is minimum may be generally represented as shown in Equation 5 below.

$$\min_{S} \sum_{k, j \in S} I(F_i; F_j) \qquad \text{Equation 5}$$

In Equation 5, S may be a combination of the neural networks including at least one of the acquired neural networks, $I(F_i; F_j)$ may be an amount of mutual information between feature representation ($F_i$) corresponding to any one neural network in the combination and feature representation ($F_j$) corresponding to another neural network in the combination.

According to an example, the amount of mutual information for a pair of neural networks may be calculated according to a method of calculating the amount of mutual information between the feature representations corresponding to the random variables in a probability distribution space corresponding to a feature space. For example, with increase in a probability that a second feature representation is restored from a first feature representation, there may also be an increase in the calculated amount of mutual information between the first feature representation output from a first neural network and the second feature representation output from a second neural network. In addition, the amount of mutual information of a pair of neural networks may be acquired based on various methods of calculating the amount of mutual information between the relevant random variables.

According to an example, the combination of the neural networks in which the sum of amounts of mutual information (e.g., for respective pairs in the combination) is minimum may be determined based on the limiting condition on the use of the plurality of available neural networks. For example, the limiting condition on the use of the plurality of available neural networks may include at least one of a condition that limits the number of neural networks included in the combination, a condition that limits the size of the neural networks included in the combination (e.g., in the aggregate), and/or a condition that limits an inference time using the neural network included in the combination (e.g., a maximum time within which an inference is to be generated). Hereinafter, the limiting condition on the use of the plurality of neural networks may be referred to as the "limiting condition".

The method of controlling a neural network, according to an example, may further include receiving state information of the apparatus and setting the limiting condition based on the received state information. Operation 120, according to an example, may include selecting the combination of the neural networks in which the sum of amounts of mutual information is minimal, based on the limiting condition that is set based on the state information of the apparatus.

According to an example, the state information of the apparatus may include information on a type of the apparatus, information on a hardware specification of the apparatus, information on a speed of the inference operation required by the apparatus, and/or information on an accuracy of the inference operation required by the apparatus.

For example, the information on a type of the apparatus may include information indicating a type of the apparatus, for example, whether a corresponding apparatus is a smartphone, a PC, a television (TV), or a refrigerator, and/or information indicating a model name of the corresponding apparatus. The limiting condition suitable for the received type of the apparatus may be set accordingly. For example, if the apparatus is a smartphone, depending on a model of a smartphone, a relaxed limiting condition may be set when the smartphone model has high performance, and a reinforced (firmer) limiting condition may be set when the smartphone model has low performance. For example, the limiting condition suitable for the received type of the apparatus may be set by referring to a table storing a predetermined limiting condition per type of the apparatus. In other words, the limiting condition may control how much neural network processing (for prediction) is to be performed in correspondence with direct or indirect indication(s) (e.g., device type) of the computing capacity of the apparatus. Similarly, the device type may be a type or model of processor.

As another example, the information on a hardware specification of the apparatus may include information on physical performance of the apparatus, information indicating an amount of available computing resources of the apparatus, and/or information indicating an amount of battery charge remaining for the apparatus. The limiting condition may be set according to an amount of the operation processible by the corresponding apparatus based on the information on a hardware specification of the apparatus. For example, when the battery charge remaining of the apparatus is equal to or less than a predetermined threshold, the limiting condition may limit the inference time to be short, or the limiting condition that limits the number of neural networks or the size of the neural network included in the combination may be set to be small. In other words, the limiting condition may control the neural network processing in accordance with indications related to computing performance.

As another example, the information on a speed of the inference operation required by the apparatus may include information indicating a priority or importance level associated with the inference operation, e.g., whether it is an urgent circumstance that needs to quickly process the inference operation in the apparatus. Similarly, information on an accuracy of the inference operation required (or preferred) by the apparatus may include information indicating the accuracy of the inference operation (values of controlling parameter(s) may be set accordingly). For example, the accuracy information may be set according to a security level of the apparatus (e.g., as described later, a current security status of the apparatus, or a security level associated with an operation to be performed by the apparatus). The speed and accuracy of the inference operation will generally be inversely related. In other words, if many inferences are performed, as the speed of the inference operation required by the apparatus generally increases, and the accuracy of the inference operation generally decreases, and as the accuracy of the inference operation required by the apparatus increases, the speed of the inference operation generally decreases (some individual inferences may be exceptions to the general tendencies). For example, in a case of an urgent circumstance where the apparatus intends the inference operation to be performed in real time (or near real time), the limiting condition that limits the inference time to be short may be set for quickly processing the inference operation by favoring processing the inference operation quickly rather than accurately. As another example, in a case where the apparatus having a high security level state (or a high security level associated with an operation that may invoke an inference), the limiting condition that limits (i) the number of neural networks and/or (ii) the size of the neural network to be large may be set to favor accurately processing the inference operation rather than quickly processing the inference operation.

The method of controlling a neural network, according to an example, may further include re-training a neural network included in the selected combination, based on training data. The re-training of the neural network included in the selected combination may be performed after operation 120 of selecting the combination. A neural network included in the combination may correspond to a previously trained neural network, and thus, the re-training may be omitted.

Operation 120 of selecting the combination of neural networks according to an example may include accessing and assessing some of various combinations of the pool of available neural networks as candidate combinations, based on the limiting condition (e.g., on a size of the combination), and calculating the sums of amounts of mutual information of one or more respective pairs of neural networks in the corresponding combination. For each such candidate combination, a combination may be selected as the combination (to be used for an inference) having the calculated sum of amounts of mutual information that is minimum (lowest) among the assessed candidate combinations. For example, the limiting condition on the size of the combination may include a condition that limits the number of neural networks included in the combination and/or a condition that limits the size of the neural network included in the combination (the size limit may be either a limit on the total size of the neural networks in the selected combination, a limit on the individual sizes of the neural networks in the combination, or a number of neural networks).

The method of controlling a neural network, according to an example, may further include selecting some neural networks having relatively small size among the neural networks included in the selected combination, based on the limiting condition on the inference time using the plurality of neural networks, after selecting the combination in which the sum of amounts of mutual information is minimum. In other words, the combination of neural networks used to perform an inference may be a subset of neural networks formed (based on a limiting condition) from an initial combination that includes neural networks selected based on measures of mutual information. Note that, for speed, measures of mutual information between neural networks may be computed in advance, and may or may not need to be re-computed if the neural networks are re-trained (more retraining may reduce the accuracy of the mutual information measures).

Figure 3:
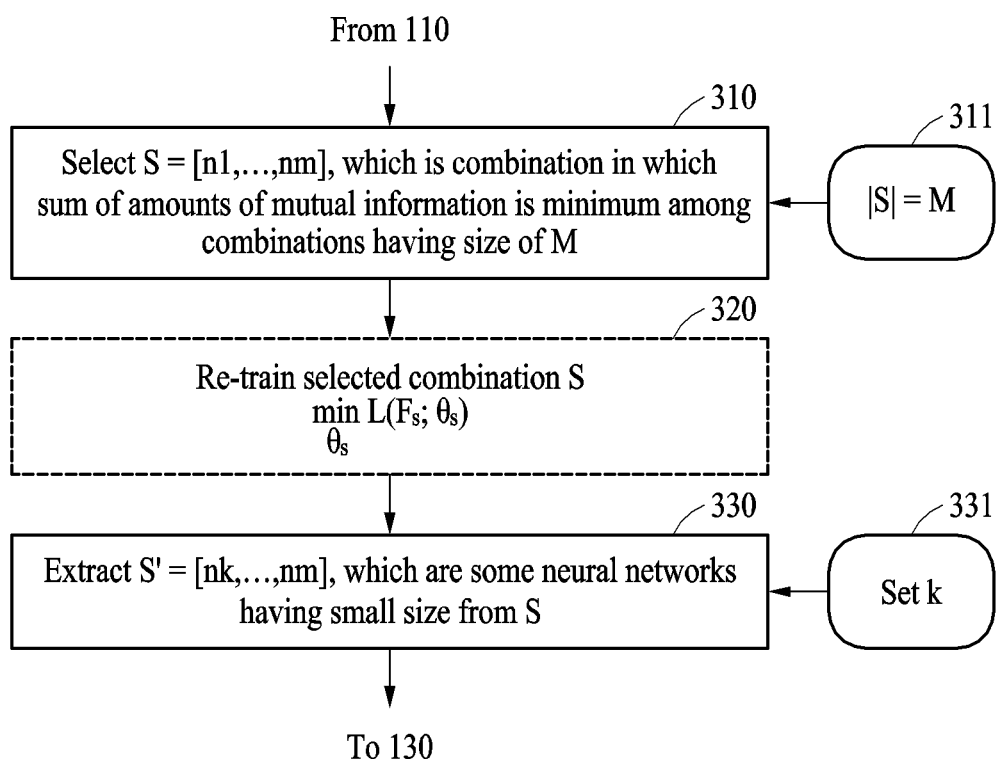
FIG. 3 illustrates an example of operations of selecting a combination in which a sum of amounts of mutual information is minimal, according to one or more embodiments.

For example, referring to FIG. 3, in operation 310, if the limiting condition on the size of the target combination is a condition 311 that limits the number of neural networks included in the combination to be M, where S=[n1 . . . ,nm] (ni represents an i-th network) is a combination selected from among various candidate combinations of M networks, and combination S is selected based on having the sum of amounts of mutual information (between its M neural networks) that is minimum (lowest) among the candidate combinations that each have M neural networks. According to an example, the limiting condition on the size of the combination may include a condition that limits the size of the neural network included in the combination to be in a predetermined range, and in this example, the combination in which the sum of amounts of mutual information is minimum may be selected, among the combinations in which a sum of sizes of the neural networks included in the combination is within a predetermined range.

According to an example, in operation 320, re-training may be performed for a selected combination S. The re-training in operation 320 may refer to performing again the training for neural networks included in the combination S, and may be omitted. Alternatively, the re-training may be performed for some of the neural networks extracted (or accessed) after operation 330.

According to an example, in operation 330, when [n1, . . . ,nm] (the neural networks included in the selected combination S) correspond to a descending order of network size, S'=[nk, . . . ,nm], which are some of the neural networks, may be a subset that is extracted from the combination S based on a limiting condition 331 on the inference time for setting k for extracting some neural networks from the selected combination S. As the limiting condition on the inference time indicates a shorter inference time, or as the speed of the inference increases, a value of k may be set to be a larger value. In other words, the final combination used to perform an inference may be a reduction (in the number of neural networks) of an earlier-formed combination, based on sizes of the neural networks, the number of neural networks, etc.

Figure 4:
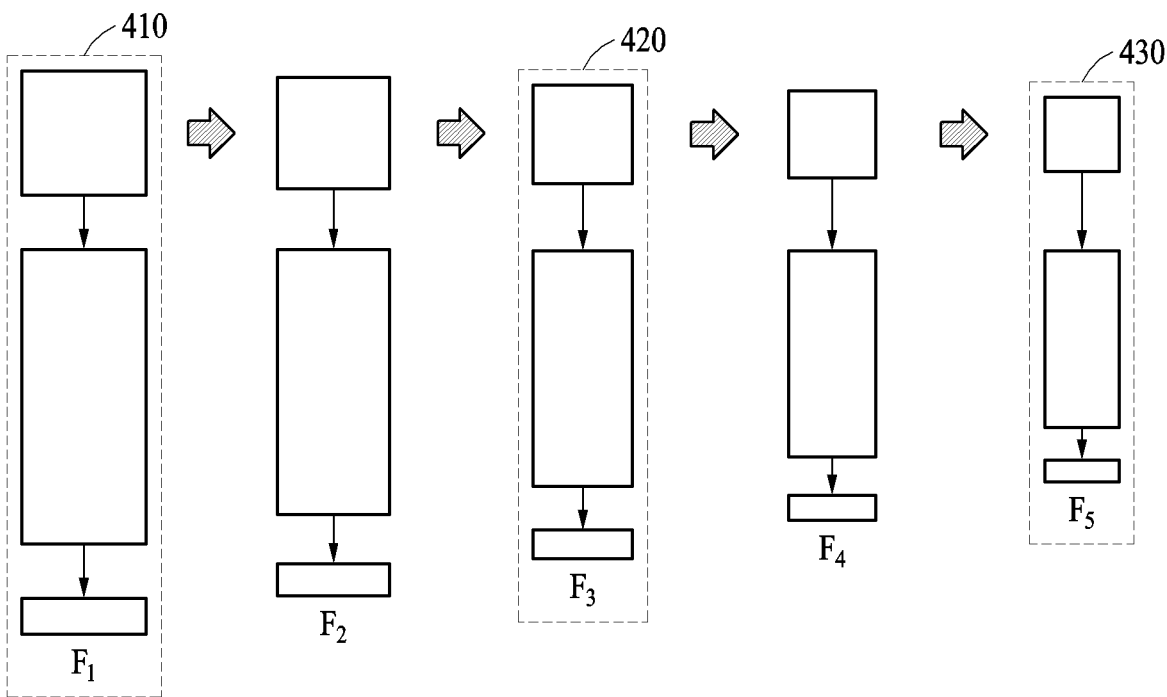
FIG. 4 illustrates example operations of extracting or accessing some neural networks from a combination selected according to state information of an apparatus, according to one or more embodiments.
Figure 5:
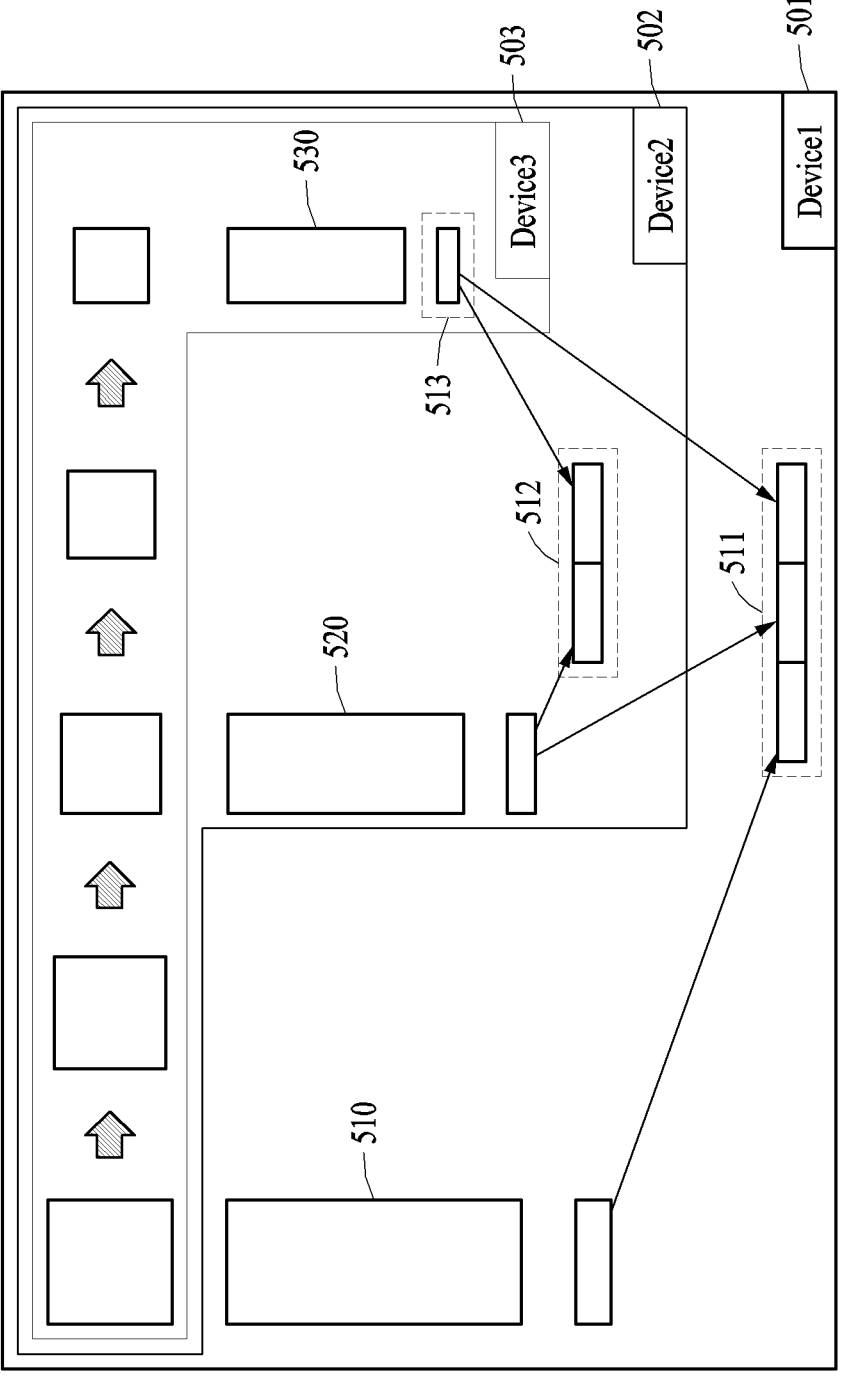
FIG. 5 illustrates example operations of extracting or accessing some neural networks from a combination selected according to state information of an apparatus, according to one or more embodiments.

According to an example, depending on the state information of the apparatus, the limiting condition on the inference time may be set differently, and the number of extracted neural networks may be correspondingly different. For example, referring to FIG. 4, a combination (e.g., S) in which the amount of mutual information is minimal may include first neural network 410, a third neural network 420, and a fifth neural network 430, and the combination may be selected, based on the condition on the size of the combination (e.g., the number of networks, the total size of the neural networks, etc.). As described above, the limiting condition on the inference time may be set based on state information of the apparatus. Based on the setting of the limiting condition on the inference time, at least some of the neural networks may be selected from the selected combination to form other combinations (subsets of set S). For example, referring to FIG. 5, among a first neural network 510, a third neural network 520, and a fifth neural network 530 included in the combination, the first neural network 510, the third neural network 520, and the fifth neural network 530 may be extracted corresponding to a first device 501, the third neural network 520 and the fifth neural network 530 may be extracted corresponding to a second device 502, and the fifth neural network 530 may be extracted corresponding to a third device 503. For example, each of the first device 501, the second device 502, and the third device 503 may correspond to each apparatus (e.g., a mobile device, a personal computer, etc.) that performs the example method of controlling a neural network. The first device 501 may perform the inference operation based on feature representations 511 output from each of the first neural network 510, the third neural network 520, and the fifth neural network 530 based on input data. The second device 502 may perform the inference operation based on feature representations 512 output from each of the third neural network 520 and the fifth neural network 530 based on input data, and the third device 503 may perform the inference operation based on a feature representation 513 output from the fifth neural network 530 based on input data. Even for the same apparatus, the limiting condition may be set differently according to the state information, such as the battery remaining (as received from the apparatus), and the number of extracted neural networks may be determined differently.

Referring to FIG. 1, operation 130 of setting (or configuring) the plurality of available neural networks, according to an example, may include activating the neural network(s) included in the selected combination among the plurality of available neural networks. In other words, a neural network included in the selected combination may be activated such that an inference operation may be performed using the neural network in the selected combination. According to an example, the apparatus may perform the inference operation on the input data by using the activated neural network.

Operation 130 of setting or configuring the plurality of neural networks, according to an example, may include performing the inference operation on the input data, based on the first neural network included in the combination, and performing the inference operation on the input data, based on the second neural network included in the selected combination while the inference operation based on the first neural network is not performed. In each case, the inference operation based on the activated neural network may include an operation for outputting the feature representation by applying the input data to the activated neural network. In other words, the neural networks in the selected combination may each be activated in turn, and each, when activated, may process the same input data to provide their own feature representations for the input data. In some examples, the neural networks in a selected combination may each predict a feature for the same input data (or versions thereof), or for different input data of a same object for which the features are to be inferred.

Figure 6:
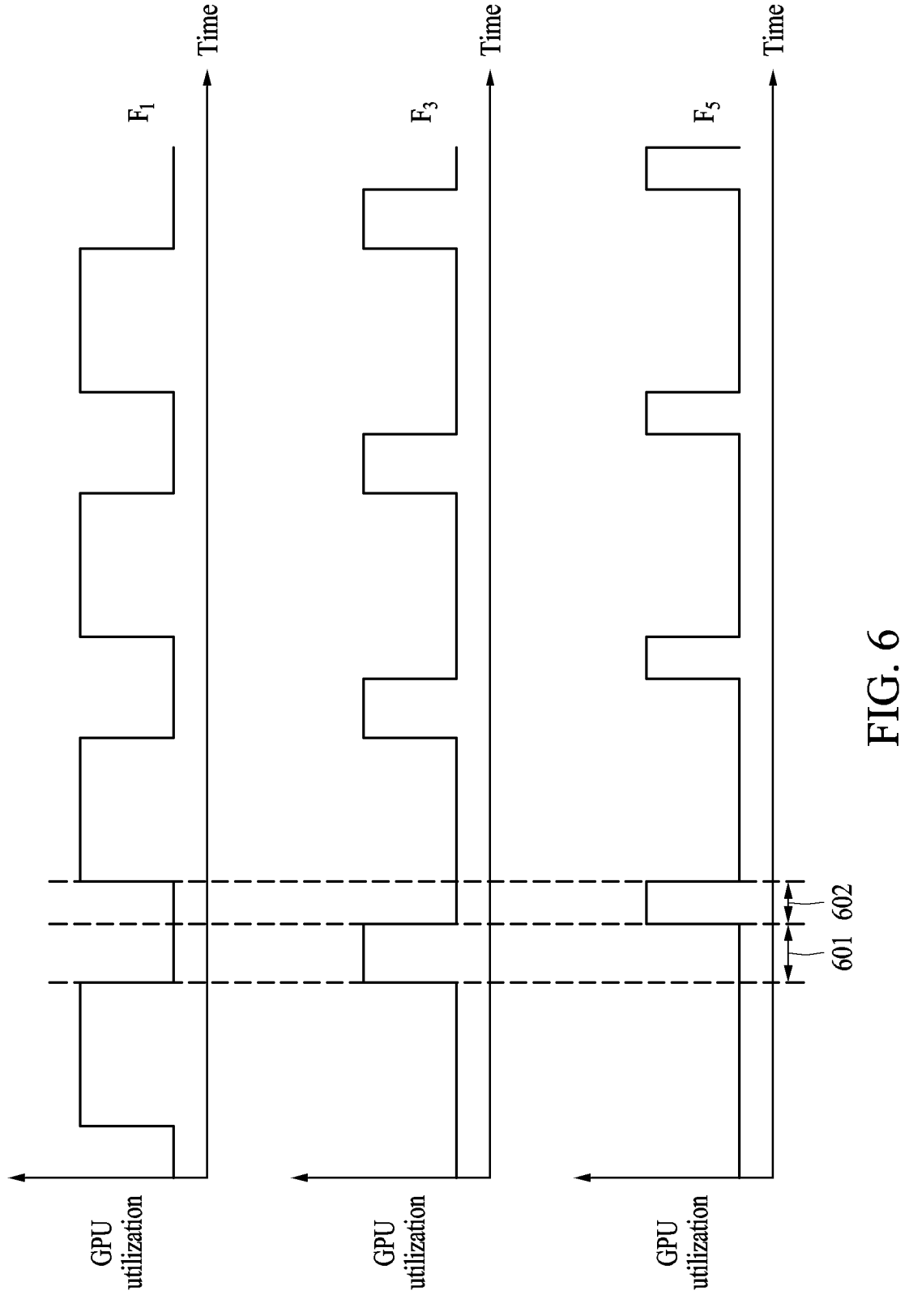
FIG. 6 illustrates an example of a utilization of a graphics processing unit (GPU) for performing an inference operation for outputting a feature representation of input data based on a neural network in an apparatus, according to one or more embodiments.

For example, FIG. 6 illustrates an example of a utilization of a GPU for performing an inference operation for outputting a feature representation of input data based on a neural network in an apparatus, according to one or more embodiments. Referring to FIG. 6, during a time period 601 when the inference operation for outputting feature representations F1 and F5 are not performed (in a GPU of the apparatus) based on the inactive first and fifth neural networks 510, 530, the inference operation for outputting feature representation F3 may be performed based on the activated third neural network 520. And, during a time period 602 when the inference operation is not performed based on the inactivated first neural network and the third neural networks 510, 520 in the GPU, the inference operation for outputting feature representation F5 may be performed based on the activated fifth neural network 530, thereby performing the inference operation (possibly in parallel) based on the plurality of neural networks.

According to some examples, operations 110 and 120 may be performed by a server or an external device. The neural network in the selected combination may be equipped in the apparatus, and/or the apparatus equipped with the neural network in the selected combination may perform operation 130.

For example, the method of controlling a neural network, performed by at least one processor of the apparatus performing the inference operation using the neural network(s) (or combination of neural networks), may include acquiring, among a plurality of available neural networks respectively trained corresponding to images having a plurality of respective resolutions, a combination of the neural networks selected based on an amount of mutual information, and setting or configuring the neural network in the selected combination to perform an inference on input data based on a limiting condition on an inference time, for example.

In some examples, the selected combination of the neural networks may be a combination in which a sum of amounts of mutual information is minimum (among the possible combinations of the neural networks extracted or accessed) and may be selected based on the limiting condition on the use of the plurality of available neural networks. The combination in which the sum of amounts of mutual information is minimum may be selected by the server or the external device, and the apparatus for performing the method of controlling a neural network may acquire the combination selected by the server or the external device.

According to an example, the setting of the neural network in the selected combination may include extracting/accessing, among the neural networks included in the selected combination, some (e.g., a proper subset) of those neural networks that have small size, based on the limiting condition on the inference time using the neural network. As described above, the apparatus may activate some extracted neural networks to be used for the inference operation, and inactivate the remaining neural networks. Put another way, in some examples, a server or service (e.g., a cloud service) may provide an initial combination of neural networks (e.g., based on minimal mutual information), an apparatus may receive the initial combination, the apparatus may select a subset of the initial combination (e.g., based on one or more conditions known to the apparatus), and may activate the neural networks in the subset (reduced/secondary combination) for inferencing (in parallel and/or in sequence) to obtain features inferred by the respective activated neural networks.

Figure 7:
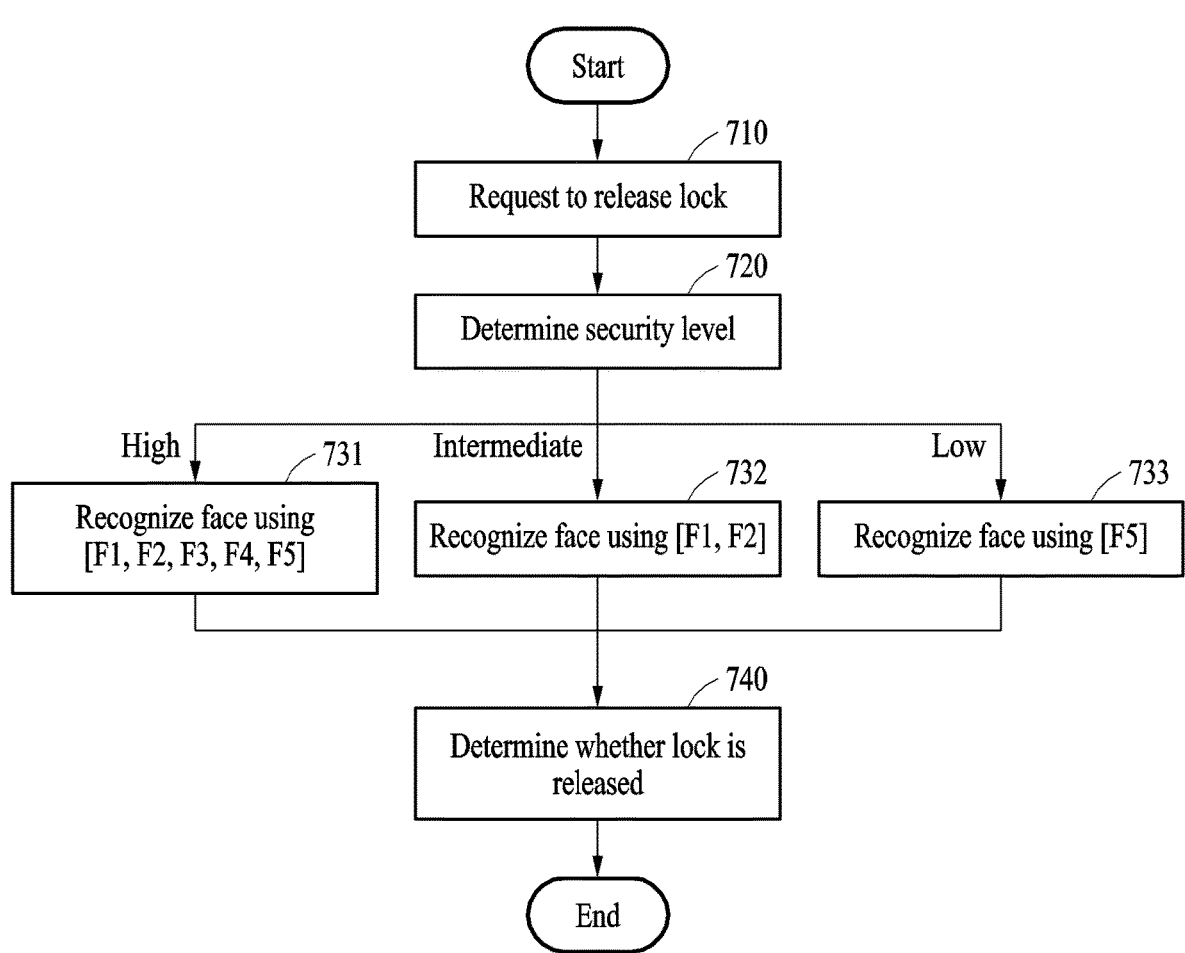
FIG. 7 illustrates an example of a utilization scenario of a method of controlling a neural network, according to one or more embodiments.

FIG. 7 illustrates an example of a utilization scenario of a method of controlling a neural network, according to one or more embodiments.

Referring to FIG. 7, the method of controlling a neural network, according to an example, may be utilized for a face recognition function for unlocking the apparatus (e.g., a mobile phone), determining a security condition for an application (e.g., authenticating a user for a particular application) etc. The face recognition function of the apparatus may be implemented by the neural network(s) trained to recognize a face based on a face image. The apparatus may acquire and store the neural network(s) for face recognition. The neural network(s) for face recognition stored in the apparatus may be neural networks trained to recognize the face based on face images having a plurality of resolutions; the acquired neural networks may be configured for different respective input resolutions.

In operation 710, the apparatus, according to an example, may receive a request to release a lock (e.g., a lock screen). For example, the request to release the lock may include a face image received through an image sensor of the apparatus in a locked state, and/or a request to release the lock based on input from a user (e.g., a swipe on a lock screen).

In operation 720, the apparatus that receives the request to release the lock according to an example may determine a corresponding security level (e.g., among "high", "intermediate", and "low"). The security level of the apparatus may correspond to an example of state information of the apparatus for setting a limiting condition. For example, the security level of the apparatus may be determined to be "high" when the apparatus is rebooted, may be determined to be "intermediate" when a predetermined threshold time elapses after the lock is to be released, and may be determined to be "low" when a predetermined threshold time does not elapse after the lock is released. That is, the security level may be "high" when the apparatus has not yet been unlocked after a reboot, may be "intermediate" when the apparatus has been unlocked after a reboot and then relocked (not by rebooting) for more than a threshold of time, and may be "low" when the apparatus has been unlocked after a reboot but only relocked (not by rebooting) for less than the threshold of time.

According to an example, the apparatus may set the limiting condition for selecting a combination of neural networks, based on the determined security level. For example, as the security level increases, the limiting condition may be set for higher accuracy (and inference time), and as the security level decreases, the limiting condition may be set focusing on a speed of the inference (and less accuracy). For example, when the security level is "high", the limiting condition may be set to use all of (or a high number of) the neural networks for the face recognition stored in the apparatus. As another example, when the security level is "intermediate", the limiting condition may be set to limit the number of neural networks included in the combination to be two, for example. As another example, when the security level is "low", the limiting condition may be set to limit the number of neural networks included in the combination to be one.

According to an example, the apparatus may select the combination of the neural networks in which the amount of mutual information is minimum, based on the set limiting condition. For example, in operation 731, when the security level is "high", a combination including all of the neural networks may be selected, and the face recognition may be performed based on feature representations [F1, F2, F3, F4, F5] for the input data output from all of the neural networks. For example, feature representations [F1, F2, F3, F4, F5] may include feature representations obtained from images of different resolutions converted from the same input image. For example, an inference result about face recognition may be obtained from a feature representation obtained by weight summing feature representations included in a subset of feature representations [F1, F2, F3, F4, F5]. For example, a final inference result about face recognition may be obtained by weighted summing the inference results obtained from each of feature representations included in a subset of feature representations [F1, F2, F3, F4, F5]. In operation

732, when the security level is "intermediate", a combination in which the amount of mutual information is minimum may be selected among the combinations including two neural networks, and the face recognition may be performed based on feature representations [F1, F2] for the input data output from the neural networks included in the combination. In operation 733, when the security level is "low", since the number of neural networks included in the combination is limited to be one, the amount of mutual information calculated between two neural networks may not be calculated (or used), and therefore, the face recognition may be performed based on feature representation F5 for the input data output from a neural network having small size among all of the neural networks.

According to an example, in operation 740, the apparatus may determine whether the lock is released, based on a result of performing the face recognition. For example, when the recognized face is determined to be a face of a registered user, it may be determined to release the lock, and when the recognized face is not determined to be a face of a registered user, it may be determined to not release the lock.

It will be appreciated that other applications and operations of the apparatus may be performed with the techniques of varying the number (and/or selection) of neural networks. For example, speed/reliability parameters may vary for different operations (and/or device states) such as recognizing two-dimensional codes, detecting objects for photography functions, general object recognition, CPU/GPU load, etc., and neural network selection and activation may vary accordingly.

Figure 8:
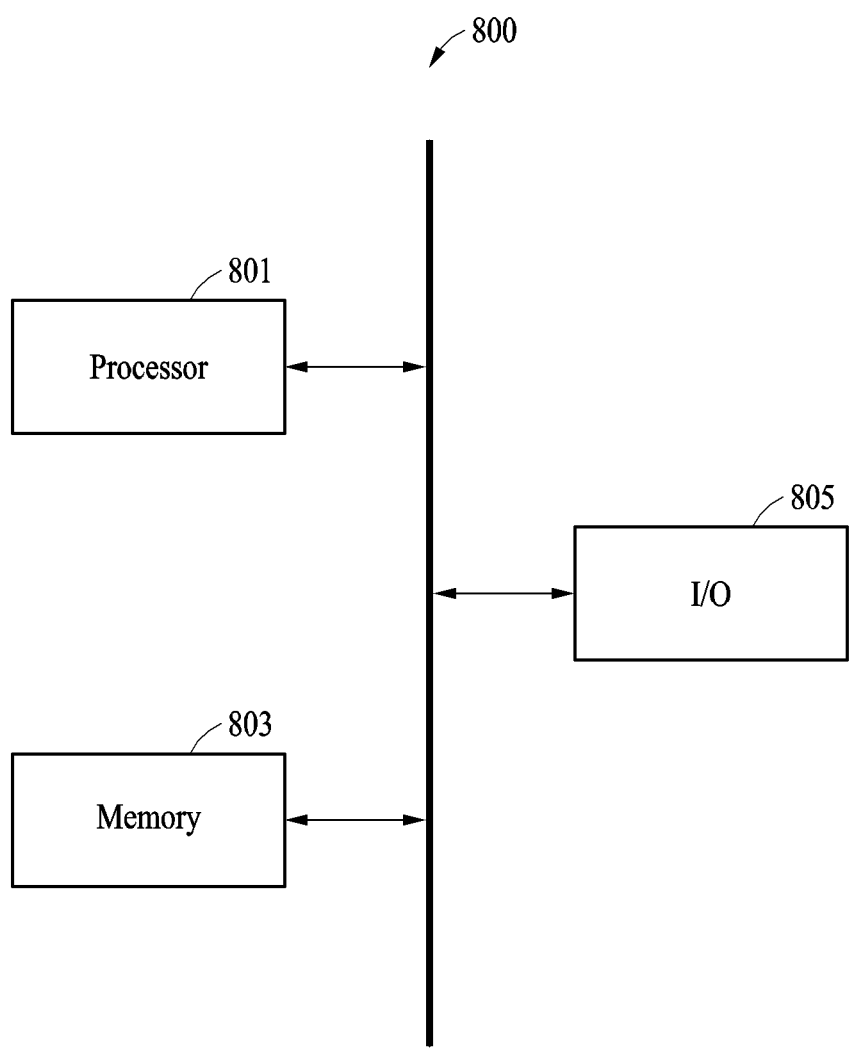
FIG. 8 illustrates an example of a configuration of an apparatus, according to one or more embodiments.

FIG. 8 illustrates an example of a configuration of an apparatus, according to one or more embodiments.

Referring to FIG. 8, an apparatus 800 may include a processor 801, a memory 803, and an input/output device 805. The apparatus 800 may include an apparatus for performing the method of controlling a neural network described with reference to FIGS. 1 through 7. In other words, the apparatus 800 may be an apparatus for performing an inference operation using the neural network, and may include, for example, a mobile device, a PC, and/or a home appliance. As described above, the neural network may include a plurality of available neural networks related to image processing trained based on images having a plurality of resolutions. For example, the plurality of neural networks may include a neural network related to image processing, such as object detection, object recognition, face recognition, etc.

The processor 801 may perform at least one operation described with reference to FIGS. 1 through 7. For example, the processor 801 may perform at least one of an operation of acquiring or accessing a plurality of neural networks trained corresponding to images having a plurality of resolutions, an operation of selecting a combination of neural networks in which a sum of amounts of mutual information is minimum, and an operation of setting the plurality of neural networks to perform inference on input data.

As another example, the processor 801 may perform an operation of acquiring the combination of the neural networks selected based on the amount of mutual information among the plurality of neural networks trained corresponding to the images having a plurality of resolutions, and/or an operation of setting/configuring the neural network in the selected combination to perform the inference on the input data based on the limiting condition on the inference time, for example. In some embodiments, the operation of acquiring the plurality of neural networks trained corresponding to the images having a plurality of resolutions, and the operation of selecting the combination of the neural networks, in which the sum of amounts of mutual information is minimum, may be performed by an external device, a server, a cloud service, etc., which may provide the neural networks to the apparatus 800.

The memory 803 may be a volatile memory or a non-volatile memory, and may store data on the method of controlling a neural network described with reference to FIGS. 1 through 7. For example, the memory 803 may store data generated during a process of performing the method of controlling a neural network, or data used to perform the method of controlling a neural network. For example, the memory 803 may store the plurality of neural networks trained based on the images having a plurality of resolutions and store a setting of the limiting condition on the use of the plurality of neural networks.

The apparatus 800 may be connected to the external device (e.g., a PC or a network) through the input/output device 805, and may exchange data with the external device. For example, the apparatus 800 may receive an input image through the input/output device 805 and output a result of the inference operation based on the neural network.

According to an example, the memory 803 may store a program in which the method of controlling a neural network described with reference to FIGS. 1 through 7 is implemented. The processor 801 may execute the program stored in the memory 803 and control the apparatus 800. Code (e.g., processor-executable instructions, bytecode, source code, etc.) of the program executed by the processor 801 may be stored in the memory 803.

The apparatus 800 may further include other elements not illustrated herein. For example, the apparatus 800 may further include a communication module. The communication module may provide a function for the apparatus 800 to communicate with another electronic device or a server through a network. As another example, the apparatus 800 may further include other elements, such as a transceiver, various sensors, a cellular communication module, a database, etc.

The examples described herein may be implemented using hardware components, software components and/or combinations thereof. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

Software may include a computer program, a piece of source code, processor-executable instructions, or some combination thereof, to independently or collectively instruct or configure the processing device (e.g., processor 801 and/or a processor of an external server) to operate as desired. Software and/or data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be those specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Non-transitory computer-readable media does not include signals per se. Examples of program instructions include both machine code, such as produced by a compiler, and files containing higher-level code that may be executed by the computer using an interpreter.

The above-described hardware devices may be configured to act as one or more software modules in order to perform the operations of the above-described examples, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method performed by one or more processors of an apparatus, the method comprising:
   selecting neural networks from among available neural networks with respective input image resolutions, including plural resolutions, wherein the selected neural networks are selected based on a sum of amounts of mutual information between the selected neural networks being minimal and based on a limiting condition of a use of the available neural networks, wherein the amount of mutual information of the combination is minimum among amounts of mutual information of respective combinations of the available neural networks, and wherein the combinations are formed based on a limiting condition of an intended use of the available neural networks; and
   configuring the available neural networks to perform an inference on input data, wherein the configuring is based on the combination of the selected neural networks.

2. The method of claim 1, further comprising:
   forming different candidate combinations of the available neural networks based on a combination size limit;
   generating, for the candidate combinations, respective sums of amounts of mutual information between the neural networks in each of the candidate combinations; and
   selecting the combination from among the candidate combinations based on the combination having the lowest of the generated sums of amounts of mutual information.

3. The method of claim 2, further comprising:
   selecting, based on an inference-time limiting condition, at least one neural network among the neural networks included in the selected combination.

4. The method of claim 1, wherein the limiting condition limits at least one of:
   a number of neural networks in the combination;
   a size of a neural network in the combination; or
   an inference time of a neural network in the combination.

5. The method of claim 1, further comprising setting the limiting condition based on the state information of the apparatus.

6. The method of claim 5, wherein the state information of the apparatus comprises information on either:
   a type of the apparatus,
   a hardware specification of the apparatus,
   a speed of an inference operation to be performed by the apparatus, or
   an accuracy of an inference operation to be performed by the apparatus.

7. The method of claim 1, wherein the configuring comprises activating the neural networks in the combination.

8. The method of claim 1, further comprising:
   re-training, based on training data, a neural network in the combination.

9. The method of claim 1, further comprising:
   performing a first inference operation on the input data based on a first neural network in the combination; and
   performing a second inference operation on the input data based on a second neural network in the combination, wherein the second inference operation is performed while the first inference operation is not being performed.

10. The method of claim 1, further comprising at least one of:
   training each of the available neural networks based on images having respectively different resolutions; or
   training all of the available neural networks based on images having a plurality of resolutions.

11. The method of claim 1, wherein the respective input image resolutions are different input image resolutions, and the available neural networks have characteristics of having been trained with respective different training image resolutions.

12. A non-transitory computer-readable storage medium storing instructions configured such that, when executed by a processor, the instructions cause the processor to perform the method of claim 1.

13. A method performed by one or more processors of an apparatus, the method comprising:

accessing, among available neural networks with respective input image resolutions, including plural resolutions, a combination of the available neural networks, wherein neural networks in the combination are selected based on an amount of mutual information therebetween, and wherein the amount of mutual information of the combination is minimum among amounts of mutual information of respective combinations of the available neural networks, wherein the combinations are formed based on a limiting condition of an intended use of the available neural networks; and configuring the neural networks in the combination to perform an inference on input data based on an inference-time limiting condition.

14. An apparatus comprising:

one or more processors;

a memory storing instructions configured to cause the one or more processors to:

select neural networks from among available neural networks, wherein the available neural networks are configured for respective input image resolutions, including plural image resolutions, wherein the selected neural networks are selected based on a sum of amounts of mutual information between the selected neural networks being minimal and based on a limiting condition of a use of the available neural networks, wherein the amount of mutual information of the combination is minimum among amounts of mutual information of respective combinations of the available neural networks, and wherein the combinations are formed based on a limiting condition of an intended use of the available neural networks; and configure the available neural networks to perform an inference on input data, wherein the configuring is based on the combination of the selected neural networks.

15. The apparatus of claim 14, wherein the memory is configured to store the available neural networks.

16. The apparatus of claim 14, wherein the instructions are further configured to cause the one or more processors to:

select some of combinations of the available neural networks as candidates, based on a combination-size limiting condition;

generate sums of amounts of mutual information of one or more pairs of neural networks in each of the combinations selected as the candidates; and select a combination having a generated sum of amounts that is the lowest among the sums.

17. The apparatus of claim 16, wherein the instructions are further configured to cause the one or more processors to select, based on an inference-time limiting condition, at least some neural networks among the neural networks included in the selected combination.

18. The apparatus of claim 14, wherein the instructions are further configured to cause the one or more processors to set the limiting condition based on state information of the apparatus.

19. The apparatus of claim 14, wherein the instructions are further configured to cause the one or more processors to activate the neural networks included in the combination.

20. The apparatus of claim 14, wherein the instructions are further configured to cause the one or more processors to re-train, based on training data, a neural network included in the selected combination.

21. The apparatus of claim 14, wherein the instructions are further configured to cause the one or more processors to:

perform a first inference operation on the input data based on a first neural network in the combination; and perform a second inference operation on the input data based on a second neural network in the combination, wherein the second inference operation is performed while the inference operation is not being performed.

22. The apparatus of claim 14, wherein the instructions are further configured to cause the one or more processors to perform at least one of:

an operation of training each of the available neural networks based on images having respectively different resolutions; or an operation of training all of the available neural networks based on images having a plurality of resolutions.

23. An apparatus comprising:

one or more processors;

a memory storing instructions configured to cause the one or more processors to:

acquire available neural networks each trained for a different respective input image resolution, wherein a combination of the available neural networks is selected based on an amount of mutual information between at least a pair of the available neural networks, wherein the amount of mutual information of the combination is minimum among amounts of mutual information of respective combinations of the available neural networks, and wherein the combinations are formed based on a limiting condition of an intended use of the available neural networks; and configure a neural network in the selected combination to perform inference on input data, based on a limiting condition.

* * * * *